United States Patent
Ikawa et al.

(10) Patent No.: US 9,797,059 B2
(45) Date of Patent: Oct. 24, 2017

(54) METHOD FOR MANUFACTURING MOLD AND METHOD FOR MANUFACTURING MOLDED ARTICLE HAVING FINE UNEVEN STRUCTURE ON SURFACE

(71) Applicants: Mitsubishi Chemical Corporation, Tokyo (JP); KANAGAWA ACADEMY OF SCIENCE AND TECHNOLOGY, Kawasaki-shi, Kanagawa (JP)

(72) Inventors: Masashi Ikawa, Otake (JP); Eiko Okamoto, Otake (JP); Hideki Masuda, Kawasaki (JP)

(73) Assignees: MITSUBISHI CHEMICAL CORPORATION, Tokyo (JP); KANAGAWA INSTITUTE OF INDUSTRIAL SCIENCE AND TECHNOLOGY, Kanagawa (JP)

( * ) Notice: Subject to any disclaimer, the term of this patent is extended or adjusted under 35 U.S.C. 154(b) by 275 days.

(21) Appl. No.: 14/403,908

(22) PCT Filed: May 28, 2013

(86) PCT No.: PCT/JP2013/064751
§ 371 (c)(1),
(2) Date: Nov. 25, 2014

(87) PCT Pub. No.: WO2013/180119
PCT Pub. Date: Dec. 5, 2013

(65) Prior Publication Data
US 2015/0140268 A1    May 21, 2015

(30) Foreign Application Priority Data
May 30, 2012 (JP) ................................. 2012-123090

(51) Int. Cl.
*C25D 11/08* (2006.01)
*C25D 11/10* (2006.01)
(Continued)

(52) U.S. Cl.
CPC ............ *C25D 11/24* (2013.01); *B08B 17/065* (2013.01); *B29C 33/38* (2013.01);
(Continued)

(58) Field of Classification Search
CPC ......... C25D 11/04; C25D 11/06; C25D 11/08; C25D 11/10
(Continued)

(56) References Cited

U.S. PATENT DOCUMENTS 4,229,266 A    10/1980  Usbeck
7,699,971 B2 *  4/2010  Hatanaka ............... C25D 11/12
                                                205/172
(Continued)

FOREIGN PATENT DOCUMENTS

CN    101240440 A    8/2008
CN    101835925 A    9/2010
(Continued)

OTHER PUBLICATIONS

Machine translation of CN 101240440, published on Aug. 13, 2008.*
(Continued)

*Primary Examiner* — Brian W Cohen
(74) *Attorney, Agent, or Firm* — FItch, Even, Tabin & Flannery LLP (57) ABSTRACT

A method for manufacturing a mold includes (a) anodizing an aluminum substrate at a voltage of 60 V to 120 V in an electrolytic solution in which two or more species of acid are mixed, and forming an oxide film having a plurality of minute holes on a surface of the aluminum substrate; and (b)
(Continued)

removing at least a portion of the oxide film. The electrolytic solution used in (a) satisfies the relation $(D1)/2<D2$, where $D1$ is the current density when the aluminum substrate is anodized under the same conditions as in (a) in an electrolytic solution of only the acid (A) having the highest acid dissociation constant (Ka) of the two or more species of acid, and $D2$ is the current density when the aluminum substrate is anodized under the same conditions (a) in the same electrolytic solution as that of (a).

18 Claims, 2 Drawing Sheets

(51) Int. Cl.

| | | |
|---|---|---|
| *C25D 11/24* | (2006.01) | |
| *C25D 11/12* | (2006.01) | |
| *C25D 11/04* | (2006.01) | |
| *B29C 33/38* | (2006.01) | |
| *B29C 33/42* | (2006.01) | |
| *G02B 1/118* | (2015.01) | |
| *B08B 17/06* | (2006.01) | |
| *B29C 59/04* | (2006.01) | |
| *B29C 35/08* | (2006.01) | |
| *B29C 37/00* | (2006.01) | |

(52) U.S. Cl.
CPC ...... *B29C 33/3814* (2013.01); *B29C 33/3842* (2013.01); *B29C 33/42* (2013.01); *C25D 11/045* (2013.01); *C25D 11/08* (2013.01); *C25D 11/10* (2013.01); *C25D 11/12* (2013.01); *G02B 1/118* (2013.01); *B29C 37/0067* (2013.01); *B29C 59/046* (2013.01); *B29C 2035/0827* (2013.01); *Y10T 428/24355* (2015.01)

(58) Field of Classification Search
USPC ........................ 205/324, 329, 332
See application file for complete search history.

(56) References Cited

U.S. PATENT DOCUMENTS

| | | | |
|---|---|---|---|
| 7,835,080 B2 | 11/2010 | Taguchi et al. | |
| 2007/0159698 A1 | 7/2007 | Taguchi et al. | |
| 2007/0289874 A1 | 12/2007 | Masuda et al. | |
| 2008/0284042 A1* | 11/2008 | Hotta | G01R 1/06755 257/775 |
| 2009/0081411 A1* | 3/2009 | Hatanaka | C25D 11/24 428/138 |
| 2009/0194914 A1 | 8/2009 | Uozu et al. | |
| 2012/0256224 A1* | 10/2012 | Hatanaka | C23C 18/1608 257/98 |

FOREIGN PATENT DOCUMENTS

| | | |
|---|---|---|
| EP | 0 008 440 A2 | 3/1980 |
| EP | 0363123 A1 | 4/1990 |
| JP | S55-28400 A | 2/1980 |
| JP | 2005-179730 A | 7/2005 |
| JP | 2008-197217 A | 8/2008 |
| JP | 2009-114470 A | 5/2009 |
| JP | 4368415 B2 | 11/2009 |
| JP | 4658129 B2 | 3/2011 |
| WO | 2005/017971 A2 | 2/2005 |

OTHER PUBLICATIONS

"Preparation of porous anodic aluminum oxide membranes with large pore diameter", Sun Tao, et al., Sciencepaper Online, vol. 3, No. 9, Sep. 2008, pp. 654-658.
Office Action dated Mar. 2, 2016, for Chinese Application No. 201380026816.5.
Office Action issued by JPO regarding JP Appln. 2013-526250, dated Oct. 4, 2016 (translation from Global dossier on Nov. 1, 2016).
International Search Report dated Sep. 10, 2013, issued in International Application PCT/JP2013/064751.
Written Opinion issued in International Application PCT/JP2013/064751.
Supplementary Partial European Search Report issued against EP13798081.9 dated Oct. 26, 2015.

* cited by examiner

METHOD FOR MANUFACTURING MOLD AND METHOD FOR MANUFACTURING MOLDED ARTICLE HAVING FINE UNEVEN STRUCTURE ON SURFACE

CROSS-REFERENCE TO RELATED APPLICATIONS

This Application is a U.S. National Stage Application filed under 35 U.S.C. §371 of International Application PCT/JP2013/064751, filed May 28, 2013, designating the United States, which claims priority from Japanese Patent Application 2012-123090, filed May 30, 2012, the complete disclosures of which are hereby incorporated herein by reference in their entirety for all purposes.

TECHNICAL FIELD

The present invention relates to a method for manufacturing a mold having a fine uneven structure composed of a plurality of micropores on a surface and a method for manufacturing a molded article having a fine uneven structure on a surface in which the mold is used.

The present application claims priority to Japanese Patent Application No. 2012-123090 which has been filed in Japan on May 30, 2012, and the content of which is incorporated herein by reference.

BACKGROUND ART

Recently, due to a progress in micro processing techniques, it becomes possible to form a fine uneven structure of nano scale on a surface of a molded article. The fine uneven structure of nano scale exhibits a structure-derived effect such as anti-reflection effect referred to as a moth-eye effect or a water repellant effect referred to as a lotus effect, and thus industrial use of a fine uneven structure of nano scale is actively made.

There are various techniques for forming a fine uneven structure on a surface of a molded article. Among them, a method of transferring a fine uneven structure formed on a surface of a mold to a surface of a main body of a molded article is suitable for industrial production because a fine uneven structure can be given to a surface of a molded article with few simple steps. Recently, as a method for simple manufacture of a large-area mold having a fine uneven structure on a surface, a method for forming an oxidized coating film having a plurality of micropores (anode oxidized porous alumina) by anodic oxidation of an aluminum substrate has drawn attention (see, Patent Documents 1 and 2, for example). The oxidized coating film formed by anodic oxidation has an increasing interval (pitch) between micropores in proportion to an applied voltage. From the viewpoint that the interval between micropores can be relatively simply controlled, the aforementioned method is suitable as a method for manufacturing a mold.

However, when a mold is manufactured by using anodic oxidation, a method by which anodic oxidation is performed in two divided steps is suitable to have both micropore depth and regular arrangement that are preferred for the mold (hereinbelow, it is also described as a "two-step oxidation method" in this specification). Specifically, by sequentially performing the following step (1) to step (3), micropores preferred for a mold are obtained.

Step (1): The surface of an aluminum substrate is subjected to anodic oxidation to have a regular arrangement of micropores while ignoring the micropore depth.

Step (2): A portion or all of the oxidized coating film formed by the step (1) is removed.

Step (3): The aluminum substrate is subjected again to anodic oxidation after the step (2) to form micropores with a certain depth while maintaining the regular arrangement.

When a mold is manufactured according to the two-step oxidation method, the thickness of an oxidized coating film that is formed by the step (1) (hereinbelow, also described as an "initially formed oxidized coating film") is preferably neither too thick nor too thin. In other words, when the oxidized coating film is thin, macro size irregularities like remnants of mechanical processing of an aluminum substrate remain even after the step (2) (for example, wrinkles generated by cutting process). When a mold with remnants of mechanical processing is used, the remnants of mechanical processing are also transferred on a surface of a main body of a molded article, and they become the reason of poor appearance. On the other hand, when the oxidized coating film is thick, the macro size irregularities like a step in a grain boundary of an aluminum substrate, which occurs after the step (2), become so significant that they can be visually recognizable. When a mold with a significant step in a grain boundary is used, the macro size irregularities like a step in a grain boundary are also transferred on a surface of a main body of a molded article, and they become the reason of poor appearance.

As described above, neither too thick nor too thin oxidized coating film formed in the step (1) is appropriate for use in a mold.

Although it may vary depending on a size of a grain of an aluminum substrate used for anodic oxidation or a method for mechanical polishing, when the initially formed oxidized coating film has a thickness in the range of 0.5 to 10 μm, there is generally no problem of using it as a mold. Thus, in order for an oxidized coating film to be formed within such range, it is necessary to suitably adjust an integrated quantity of electricity generated by anodic oxidation by controlling time or current density for anodic oxidation.

In Patent Document 1, for example, the thickness of an oxidized coating film is controlled by suitably modifying the time for anodic oxidation when an oxidized coating film in which an interval between micropores is 100 nm is formed by using an oxalic acid electrolytic solution having a concentration of 0.3 M and a temperature of 17° C. and performing anodic oxidation with an applied voltage of 40 V. However, under such conditions, the current density significantly increases and the rate of forming an oxidized coating film is significantly fast when the voltage is high. As such, it is difficult to control the oxidized coating film at 10 μm or less. The applicable applied voltage is less than 70 V at most.

In Patent Document 2, anodic oxidation is performed by using an oxalic acid electrolytic solution having a concentration of 0.05 mol/L and a temperature of 3° C. and an applied voltage of 80 V. By suppressing the concentration or temperature of an electrolytic solution, the current density is lowered to enable anodic oxidation at an applied voltage of 80 V. There is no description in Patent Document 2 relating to the thickness of an oxidized coating film. However, although the thickness is suitable, special equipment for maintaining the electrolytic solution at a low temperature of 3° C. is required in order to make the condition be industrially feasible, and thus it is not economically feasible.

As a method for controlling current density while maintaining the applied voltage, a method of modifying an electrolytic solution may be considered. In principle, by suitably selecting various electrolytic solutions that are described in Patent Documents 1 and 2, it is possible to easily control the thickness of an oxidized coating film without using special equipment for maintaining an electrolytic solution at a low temperature.

However, when an oxidized coating film is formed by using phosphoric acid or the like as an electrolytic solution, it is possible to increase the applied voltage to 80 V or higher, but problems like uneven thickness of an oxidized coating film or extremely disordered diameter of a micropore are yielded, and thus it is difficult to form an oxidized coating film that is suitable for use in a mold.

CITATION LIST

Patent Document

Patent Document 1: Japanese Patent No. 4658129
Patent Document 2: Japanese Patent No. 4368415

DISCLOSURE OF THE INVENTION

Problem to be Solved by the Invention

The present invention is devised under the circumstances described above, and is to provide a method for manufacturing a mold by which a current density can be controlled even when an applied voltage is high, the thickness of an initially formed oxidized coating film or oxidation time can be easily controlled without using special equipment, and a relatively homogenous diameter of a depression, which is formed on an aluminum substrate, can be obtained by removing the thickness of the initially formed oxidized coating film or at least a portion of an oxidized coating film; and a method for simple manufacture of a molded article which has a fine uneven structure composed of a plurality of protrusions on a surface.

Means for Solving Problem

As a result of intensive studies, inventors of the present invention found that, by using an electrolytic solution having two or more kinds of acid mixed therein at a desirable ratio, the current density can be controlled even when an applied voltage is high, and the thickness of an initially formed oxidized coating film or oxidation time can be easily controlled without using special equipment, and also by removing the thickness of the initially formed oxidized coating film or at least a portion of the oxidized coating film, a relatively homogeneous diameter of a depression, which is formed on an aluminum substrate, can be obtained. The present invention is completed accordingly.

(1) A method for manufacturing a mold according to a first embodiment of the present invention is a method for manufacturing a mold which has an oxidized coating film having a plurality of micropores formed on a surface of an aluminum substrate, the method including:

step (a): a step in which anodic oxidation of an aluminum substrate is performed at a voltage of 60 V to 120 V in an electrolytic solution having two or more kinds of acid mixed therein to form an oxidized coating film having a plurality of micropores on a surface of the aluminum substrate; and step (b): a step in which at least a portion of the oxidized coating film which has been formed in the step (a) is removed, in which, as the electrolytic solution having two or more kinds of acid mixed therein for use in the step (a), a solution satisfying the following condition ($\alpha$) is used.

(Condition ($\alpha$))

Upon $D_1$ is the current density when the aluminum substrate is subjected to anodic oxidation under the same conditions as in the step (a) in an electrolytic solution of only the acid A having the highest acid dissociation constant Ka of the two or more kinds of acid, and $D_2$ is the current density when the aluminum substrate is subjected to anodic oxidation under the same conditions as in the step (a) in the same electrolytic solution as that of the step (a), $D_1$ and $D_2$ satisfy the following formula (1).

$$(D_1)/2 > D_2 \tag{1}$$

(2) The method for manufacturing a mold of (1) above, in which the anodic oxidation of the aluminum substrate is performed at a voltage of more than 70 V but less than 120 V in the step (a), and a solution further satisfying the following condition ($\beta$) is used as the electrolytic solution having two or more kinds of acid mixed therein for use in the step (a).

(Condition ($\beta$))

The ratio of the volume molar concentration of an acid other than the acid A to the volume molar concentration of the acid A (x=other acid/acid A×100) satisfies the following formula (2).

$$0.85V - 60 < x < 140 \tag{2}$$

In the formula, V represents the voltage applied during anodic oxidation in the step (a).

(3) The method for manufacturing a mold of (2) above, in which the anodic oxidation of the aluminum substrate is performed at a voltage of 75 V to 110 V in the step (a).

(4) The method for manufacturing a mold of any one of (1) to (3) above, in which the initial temperature of the electrolytic solution having two or more kinds of acid mixed therein in the step (a) is 6° C. or higher.

(5) The method for manufacturing a mold of any one of (1) to (4) above, in which the acid A used in the step (a) is oxalic acid.

(6) The method for manufacturing a mold of any one of (1) to (5) above, in which the acid other than the acid A for use in the step (a) is phosphoric acid.

(7) The method for manufacturing a mold of any one of (1) to (6) above, in which the electrolytic solution having two or more kinds of acid mixed therein for use in the step (a) consists of a mixture solution of oxalic acid and phosphoric acid.

(8) The method for manufacturing a mold of any one of (1) to (7) above, further including the following steps (c) to (e), step (c): a step in which the aluminum substrate is subjected to anodic oxidation after the step (b) or the following step (d) to form an oxidized coating film having a plurality of micropores, step (d): a step in which a portion of the oxidized coating film is removed after the step (c) and the pore diameter of the micropores is enlarged, and step (e): a step in which the step (c) and the step (d) are alternately repeated.

(9) The method for manufacturing a mold of (8) above, in which the aluminum substrate is subjected to anodic oxidation in the step (c) at a voltage of 60 V to 120 V in an electrolytic solution having two or more kinds of acid mixed therein, and a solution satisfying the following condition (α') is used as the electrolytic solution having two or more kinds of acid mixed therein for use in the step (c).

(Condition (α'))

Upon D1' is the current density when the aluminum substrate is subjected to anodic oxidation under the same conditions as in the step (c) in an electrolytic solution of only the acid A' having the highest acid dissociation constant Ka of the two or more kinds of acid, and D2' is the current density when the aluminum substrate is subjected to anodic oxidation under the same conditions as in the step (c) in the same electrolytic solution as that of the step (c), D1' and D2' satisfy the following formula (1').

$$(D1')/2 > D2' \quad (1')$$

(10) The method for manufacturing a mold of (9) above, in which the anodic oxidation of the aluminum substrate is performed at a voltage of more than 70 V but less than 120 V in the step (c), and a solution further satisfying the following condition (β') is used as the electrolytic solution having two or more kinds of acid mixed therein for use in the step (c).

(Condition (β'))

The ratio of the volume molar concentration of an acid other than the acid A' to the volume molar concentration of the acid A' (x'=other acid/acid A'×100) satisfies the following formula (2').

$$0.85V' - 60 < x' < 140 \quad (2')$$

In the formula, V' represents the voltage applied during anodic oxidation of the step (c).

(11) The method for manufacturing a mold of (10) above, in which the anodic oxidation of the aluminum substrate is performed at a voltage of 75 V to 110 V in the step (c).

(12) The method for manufacturing a mold of any one of (9) to (11) above, in which the initial temperature of the electrolytic solution having two or more kinds of acid mixed therein in the step (c) is 6° C. or higher.

(13) A method for manufacturing a molded article having a fine uneven structure on a surface by transferring, to a surface of a main body of a molded article, a fine uneven structure composed of a plurality of micropores that is formed on a surface of a mold obtained by the method for manufacturing a mold of any one of (1) to (12) above.

(14) An image display device in which a molded article having, on a surface, a fine uneven structure manufactured by the method of (13) above is used.

Effect of the Invention

According to the method for manufacturing a mold as described in the present invention, the current density can be controlled even when an applied voltage is high, the thickness of an initially formed oxidized coating film or oxidation time can be easily controlled without using special equipment, and a relatively homogeneous diameter of a depression, which is formed on an aluminum substrate by removing the thickness of the initially formed oxidized coating film or at least a portion of an oxidized coating film, can be obtained. Because the thickness of the initially formed oxidized coating film can be adjusted to a range of 0.5 to 10 μm, an occurrence of macro size irregularities can be suppressed and a relatively homogeneous diameter of a depression, which is formed on an aluminum substrate, can be obtained. As such, when an oxidized coating film having a plurality of micropores is formed by using this aluminum substrate, a structure in which the micropores formed on the aluminum substrate are relatively evenly arranged can be obtained.

Further, according to the method for manufacturing a molded article having a fine uneven structure on a surface as described in the present invention, a molded article having, on a surface, a fine uneven structure consisting of a plurality of protrusions can be simply manufactured.

MODE(S) FOR CARRYING OUT THE INVENTION

Definition of the terms described below shall apply to the description and claims of the present invention.

The term "micropores" indicate a concave part of a fine uneven structure that is formed in an oxidized coating film on a surface of an aluminum substrate.

The term "interval between micropores" means a center-to-center distance between adjacent micropores.

The term "protrusions" means a convex part of a fine uneven structure formed on a surface of a molded article.

The term "fine uneven structure" means a structure in which the average interval of a convex part or a concave part is at nano scale.

The term "(meth)acrylate" is a general name for acrylate and methacrylate.

The term "active energy ray" means visible ray, ultraviolet ray, electron beam, plasma, heat ray (infrared ray or the like), or the like.

When the acid is a polybasic acid, the simple description of "acid dissociation constant Ka" means the first dissociation constant Ka1.

[Method for Manufacturing Mold]

The method for manufacturing a mold according to the present invention is a method including the following step (a) and step (b). Although the object of the present invention can be achieved with a method just having the step (a), from the viewpoint that the step (b) is required for evaluation of a manufactured mold, it is sufficient to have at least the step (a) and the step (b). Further, from the viewpoint of having both the desirable pore depth and regular arrangement in the mold, it is preferred to have the following step (c) and the step (d) after the step (b). Further, from the viewpoint of having a tapered shape of micropores in which diameter of the micropore gradually decreases in depth direction from the opening, it is preferred to have the following step (c) to the step (e) after the step (b).

Step (a): a step in which anodic oxidation of an aluminum substrate is performed at a voltage of 60 V to 120 V in an electrolytic solution having two or more kinds of acid mixed therein to form an oxidized coating film having a plurality of micropores on a surface of the aluminum substrate.

Step (b): a step in which at least a portion of the oxidized coating film which has been formed in the step (a) above is removed.

Step (c): a step in which the aluminum substrate is subjected to anodic oxidation after the step (b) or the following step (d) to form an oxidized coating film having a plurality of micropores.

Step (d): a step in which a portion of the oxidized coating film is removed after the step (c) and the pore diameter of the micropores is enlarged.

Step (e): a step in which the step (c) and the step (d) are alternately repeated.

Hereinbelow, detailed explanations of each step are given.

<Step (a)>

Step (a) is a step for forming a first oxidized coating film in which an aluminum substrate is subjected to anodic oxidation at a voltage of 60 V to 120 V in an electrolytic solution having two or more kinds of acid mixed therein to form an oxidized coating film having a plurality of micropores on a surface of the aluminum substrate.

Figure 1:
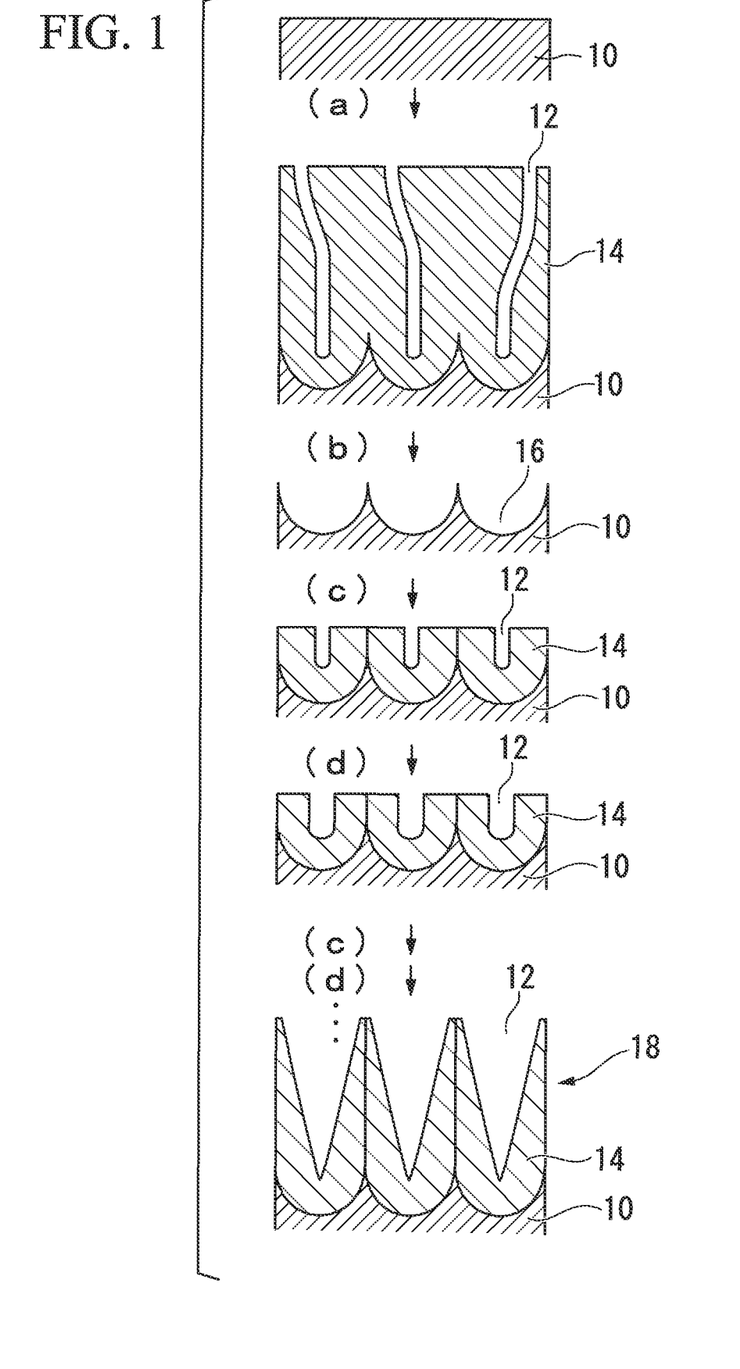
FIG. 1 is a cross-sectional view illustrating the process for manufacturing a mold which has an oxidized coating film with a plurality of micropores formed on a surface of an aluminum substrate.

By performing the step (a), the oxidized coating film 14 having a plurality of the micropore 12 is formed on a surface of the aluminum substrate 10, as shown in FIG. 1, for example.

According to anodic oxidation by which a portion or all of the surface of an aluminum substrate is immersed in an electrolytic solution, an oxidized coating film can be formed on a portion which has been immersed in an electrolytic solution. The oxidized coating film formed at initial stage of anodic oxidation has absolutely no regularity due to heterogeneous position or size of the micropores. However, in accordance with thickening of an oxidized coating film, regularity of the micropore arrangement is gradually improved.

The shape of the aluminum substrate is not particularly limited, and it may be a plate shape, a column shape, a cylinder shape, or the like which can be used as a mold.

It is preferable that the aluminum substrate has a surface polished by a known polishing method (for example, mechanical polishing, fabric polishing, chemical polishing, and electrolytic polishing) so that at least a portion for anodic oxidation is processed to have mirror finish.

Purity of the aluminum plate is preferably more than 99.0%, more preferably 99.5% or more, and most preferably 99.9% or more. If the purity of the aluminum plate is more than 99.0%, macro size irregularities that are generated by release of an intermetallic compound in impurities are not exceedingly high during the process for manufacturing a mold.

Average grain diameter of the aluminum substrate is preferably 100 μm or less, more preferably 80 μm or less, and even more preferably 60 μm or less. When the average grain diameter is 100 μm or less, the macro size uneven structure, which is generated by removing the first oxidized coating film when using a two-step oxidation method, is relatively not prominent so that it can be suitably used for a mold of a transparent material.

The average grain diameter of the aluminum substrate is an average value of the diameter of a hypothetical circle which is calculated from at least 100 grains selected arbitrarily from a processed surface of an aluminum substrate. Observation of the grains on a processed surface can be performed by using an optical microscope or the like. The average value of diameter of a hypothetical circle is obtained by using an image analysis software such as "Image-Pro PLUS" produced by Nippon Roper Co., Ltd.

In the step (a), an aluminum substrate is subjected to anodic oxidation which uses an electrolytic solution having two or more kinds of acid with different acid dissociation constant mixed therein. Examples of an acidic aqueous solution used as an electrolytic solution of the step (a) include an aqueous solution having two or more kinds of acid mixed therein, in which the acid is selected from inorganic acids (sulfuric acid (pKa=about −3), phosphoric acid (pKa=about 2.12), chromic acid (pKa=about 0.74), nitric acid (pKa=about −1.32) or the like) and organic acids (oxalic acid (pKa=about 1.27), malonic acid (pKa=about 2.85), tartaric acid (pKa=about 3), succinic acid (pKa=about 4.2), malic acid (pKa=about 3.4), citric acid (pKa=about 3.09) or the like). Meanwhile, even when it is not illustrated in the detailed description of the present invention, any acid can be used if it is capable of forming, on an aluminum surface, an oxidized coating film having a plurality of micropores by anodic oxidation.

As for the electrolytic solution having two or more kinds of acid mixed therein for use in the step (a), those satisfying the following condition (α) are used.

(Condition (α))

If D1 is the current density (maximum value) when an aluminum substrate is subjected to anodic oxidation under the same conditions (same concentration of the acid A, same voltage, and same temperature) as in the step (a) in an electrolytic solution of only the acid A having the highest acid dissociation constant Ka of the two or more kinds of acid (hereinbelow, also referred to as a "first acid"), and D2 is the current density (maximum value) when the aluminum substrate is subjected to anodic oxidation under the same conditions (same voltage and same temperature) as in the step (a) in the same electrolytic solution as that of the step (a), D1 and D2 satisfy the following formula (1).

$$(D1)/2 > D2 \tag{1}$$

As for a method for determining the composition of an electrolytic solution which satisfies the formula (1), a method in which a first acid is firstly determined and type and ratio of other acid having lower acid dissociation constant than the first acid (hereinbelow, also referred to as a "second acid") is determined based on the applied voltage is preferable.

An acid with high acid dissociation constant Ka (an acid with low pKa, which is negative logarithm of an acid dissociation constant) is generally a strong acid, and it tends to increase current density when used as an electrolytic solution. For example, when voltage near 25 V is applied, sulfuric acid having acid dissociation constant pKa of about −3 is known to yield anode oxidized porous alumina having a fine uneven structure in which the interval between micropores is 60 nm or so. However, when applied with higher voltage, the current density increases and thermal runaway is caused by Joule heating based on resistance of aluminum, thus fusing of aluminum is sometimes yielded. Further, in case of oxalic acid which has an acid dissociation constant pKa of about 1.27, it is known to yield anode oxidized porous alumina having a fine uneven structure in which the interval between micropores is 100 nm or so when voltage of approximately 40 V is applied. However, when applied with higher voltage, the current density increases to an extreme level and thermal runaway may be caused.

On the other hand, when anodic oxidation is performed by using phosphoric acid which has an acid dissociation constant pKa of about 2.12, it is known that anode oxidized porous alumina having a fine uneven structure with some regularity in which the interval between micropores is 350 nm or so is obtained when voltage near 160 V is applied. However, when anodic oxidation is performed by using an acid with a low acid dissociation constant such as phosphoric acid, malonic acid (pKa of about 2.85), or tartaric acid (pKa of about 3), there has been a problem that an oxidized coating film is formed very slowly, regularity of a fine uneven structure is much lower compared to a case in which anodic oxidation is performed by using an acid with high acid dissociation constant, and heterogeneity in film thickness easily occurs in an oxidized coating film to be formed. Further, as the interval between micropores is large in the fine uneven structure, it is not suitable for a mold which is used for manufacturing an anti-reflection product. In order to obtain a fine uneven structure in which the interval between micropores is about 100 to 300 nm, which is preferred in terms of manufacturing an anti-reflection product, it is necessary to perform anodic oxidation with application of a voltage at 60 V to 120 V. However, with an acid having low acid dissociation constant, an oxidized coating film hardly grows even when anodic oxidation is performed with application of a voltage at 60 V to 120 V, and thus a fine uneven structure with regularity is not obtained, either.

For such reasons, to obtain anode oxidized porous alumina having a fine uneven structure with relatively high regularity by applying a voltage of 60 V or more, anodic oxidation is conventionally performed at low temperature by using an acid with high acid dissociation constant as an electrolytic solution so that an excessive increase in current density can be suppressed. However, for performing anodic oxidation of aluminum by applying high voltage while maintaining, at low temperature, the aluminum which emits heat as Joule heating, special equipment is required, and it is particularly difficult to perform anodic oxidation of an aluminum substrate with large area.

The inventors of the present invention found that, by mixing an acid with high acid dissociation constant such as sulfuric acid or oxalic acid with an acid with low acid dissociation constant such as phosphoric acid, malonic acid, or tartaric acid, current density can be significantly lowered, and thus anode oxidized porous alumina can be obtained by simply applying a voltage of 60 V to 120 V. The present invention is completed accordingly. For example, when anodic oxidation is performed in an environment of 60 V and 15° C. by using a mixture solution of 0.3 M oxalic acid and 0.1 M phosphoric acid, the current density can be greatly lowered compared to a case in which anodic oxidation is performed by using oxalic acid only.

Thus, when the applied voltage is 80 V, for example, an anodic oxidation treatment can be performed by mixing oxalic acid, which is preferably used in a voltage range near 40 V, as a first acid with an acid having lower acid dissociation constant than oxalic acid, for example, phosphoric acid, malonic acid, and tartaric acid to relatively easily form an oxidized coating film of which micropores are arranged with high regularity and of which thickness heterogeneity is low. Meanwhile, it is more preferable that oxalic acid and phosphoric acid are used as a first acid and a second acid, respectively.

The ratio of mixing the first acid and the second is set such that the aforementioned D1 and D2 satisfy the formula (1) described above.

More specifically, molar ratio of the second acid relative to the first acid is preferably 10% to 150%, more preferably 12.5% to 140%, and even more preferably 15% to 135%. With the molar ratio of 10% or more, the current density can be reduced to less than half of a case in which anodic oxidation is performed by using the first acid only. With the molar ratio of 140% or lower, adverse effects caused by the second acid, that is, heterogeneous diameter of depression which is formed on an aluminum substrate by removing the thickness of an oxidized coating film or a portion of an oxidized coating film, can be sufficiently avoided.

Explanations of concentration of an electrolytic solution are given with an example in which oxalic acid is used as a first acid and phosphoric acid is used as a second acid.

The concentration of oxalic acid is preferably 0.3 to 1.5 M, more preferably 0.3 to 1.0 M, and even more preferably 0.3 to 0.8 M. When the concentration of oxalic acid is within this range, diameter of the micropore which is formed on an oxidized coating film or diameter of a depression which is formed on an aluminum substrate when anodic oxidation is performed in a voltage range of 60 V to 120 V can be maintained relatively homogeneously.

The concentration of phosphoric acid is preferably such that it is 10% to 150% in terms of molar ratio compared to oxalic acid. When the concentration of phosphoric acid is within this range, the current density during anodic oxidation can be sufficiently suppressed. Low current density is effective in that not only problems caused by high current density referred to as thermal runaway or thermal degradation can be prevented but also an oxidized coating film having homogeneous thickness can be formed.

Meanwhile, even with the same concentration and the same applied voltage, the current density can be significantly lowered when the temperature of an electrolytic solution is lowered. From the viewpoint of easy controlling and maintaining of the temperature of an electrolytic solution, the initial temperature of the electrolytic solution is preferably 6° C. or higher, more preferably 8° C. or higher, and even more preferably 10° C. or higher. Meanwhile, when an aqueous acid solution is used as an electrolytic solution, the initial temperature of the electrolytic solution is preferably 30° C. or lower from the viewpoint of suppressing a change in concentration which is caused by evaporation. The temperature of 30° C. or lower allows good environment for controlling the concentration of an electrolytic solution.

The thickness of an oxidized coating film formed in the step (a) is preferably 0.5 to 10 μm. When the thickness of the oxidized coating film is within this range, remnants of mechanical polishing on a surface of an aluminum substrate are fully removed when an oxidized coating film is removed during the step (b) described below, and also a step in a grain boundary is not large enough to be visually recognizable. Because the transfer of macro size irregularities derived from a mold onto a surface of a main body of a molded article can be avoided, it is suitable for use as a mold.

The thickness of the oxidized coating film is proportional to an integrated quantity of electricity, which is a product of current density and time for oxidation. By modifying the current density and time for oxidation, thickness of the oxidized coating film can be adjusted.

The applied voltage employed in the step (a) is 60 V to 120 V, and preferably higher than 70 V but lower than 120 V, considering that an electrolytic solution having two or more kinds of acid mixed therein is obstinately used. From the viewpoint of obtaining an oxidized coating film with high quality, that is, little deviation in diameter of a depression and little heterogeneity in film thickness, it is more preferably 75 V to 110 V. An electrolytic solution like sulfuric acid, oxalic acid, and phosphoric acid, which are conventionally used as an representative example, is known by experience with a preferred voltage range which allows relatively easy formation of an oxidized coating film of which micropores are arranged with high regularity and thickness heterogeneity is low. The voltage range of 60 V to 120 V is outside of any of those voltage ranges. In other words, it can be defined as a voltage range in which the effect by the electrolytic solution having two or more kinds of acid mixed therein can be most easily exhibited.

Meanwhile, since high applied voltage may easily lead to a huge increase in current density, a risk of having thermal runaway or thermal degradation tends to increase. Thus, it is preferable that the mixing ratio of the second acid is adjusted in accordance with the applied voltage. Specifically, as an electrolytic solution having two or more kinds of acid mixed therein for use in the step (a), it is preferred to further satisfy the following condition ($\beta$).

(Condition ($\beta$))

The ratio of the volume molar concentration of a second acid relative to the volume molar concentration of a first acid (x=second acid/first acid×100) satisfies the following formula (2).

$$0.85V-60<x<140 \qquad (2)$$

In the formula, V represents the voltage applied during anodic oxidation in the step (a).

With the volume molar concentration ratio x of (0.85V−60)% or higher, anodic oxidation can be conveniently performed while suppressing an excessive increase in current density and also suppressing an occurrence of thermal runaway or thermal degradation. With the volume molar concentration ratio x of 140% or lower, extremely slow forming of an oxidized coating film can be suppressed and also the diameter of micropores that are formed in an oxidized coating film or the diameter of depression formed on an aluminum substrate can be maintained at a relatively homogeneous level.

<Step (b)>

The step (b) is a step for removing an oxidized coating film by which a portion or all of the oxidized coating film formed in the step (a) above is removed.

When the step (b) is performed, the entire oxidized coating film 14 is removed so that the depression 16 is exposed on a surface of the aluminum substrate 10 as shown in FIG. 1, for example.

By removing a portion or all of the oxidized coating film, a depression consisting of a barrier layer of a bottom part of the oxidized coating film or a depression corresponding to the shape of the barrier layer is exposed on a surface of an aluminum substrate. By forming, in the step (a), the micropores that are arranged with regularity, a depression formed by removing a portion or all of the oxidized coating film in the step (b) can also have a regular arrangement.

As for the method for removing a portion or all of the oxidized coating film 14, a method of immersing in a solution which can selectively dissolve alumina without dissolving aluminum can be mentioned. Examples of such solution include mixture liquid of chromic acid/phosphoric acid.

<Step (c)>

The step (c) is a step for forming, after the step (b) or the following step (d), a second oxidized coating film by which an oxidized coating film having a plurality of micropores is formed by immersing the aluminum substrate in an electrolytic solution and subjected again to anodic oxidation.

When the step (c) is performed after the step (b), the aluminum substrate 10 is subjected to anodic oxidation to form again the oxidized coating film 14 having a plurality of the micropore 12, as shown in FIG. 1, for example.

Further, when the step (c) is performed after the step (d), a new oxidized coating film is formed beneath the existing oxidized coating film so that new micropores which extend downward from the bottom part of the existing micropores are formed.

When the anodic oxidation is performed again while a depression has been formed on a surface of an aluminum substrate, the depression serves as a point for generating micropores and the micropores of a new oxidized coating film occur at a position which corresponds to the depression. When the depression is arranged with regularity, in particular, even at early stage of anodic oxidation, that is, a state in which newly formed oxidized coating film is thin, regularly-arranged micropores are formed and the pore depth is adjusted to submicron order, and thus it is possible to produce easily the micropores that are arranged with regularity.

Regarding the step (c), an aluminum substrate is subjected to anodic oxidation preferably by using an electrolytic solution in which two or more kinds of acid with different acid dissociation constant are mixed.

As for the electrolytic solution to be used in the step (c) in which two or more kinds of acid are mixed, it is preferable to use a solution satisfying the following condition ($\alpha'$).

(Condition ($\alpha'$))

If D1' is the current density (maximum value) when the aluminum substrate is subjected to anodic oxidation under the same conditions (same concentration of acid A', same voltage, and same temperature) as in the step (c) in an electrolytic solution of only the acid A' having the highest acid dissociation constant Ka of the two or more kinds of acid (hereinbelow, also referred to as a "first acid"), and D2' is the current density (maximum value) when the aluminum substrate is subjected to anodic oxidation under the same conditions (same voltage and same temperature) as in the step (c) in the same electrolytic solution as that of the step (c), D1' and D2' satisfy the following formula (1').

$$(D1')/2>D2' \qquad (1')$$

As for a method for determining the composition of an electrolytic solution satisfying the formula (1'), a method in which a first acid is firstly determined and type and ratio of other acid having lower acid dissociation constant than the first acid (hereinbelow, also referred to as a "second acid") is determined based on the applied voltage is preferable.

The mixing ratio between the first acid and the second acid is determined such that the aforementioned D1' and D2' satisfy the formula (1') described above.

Meanwhile, since high applied voltage may easily lead to a huge increase in current density, a risk of having thermal runaway or thermal degradation tends to increase. Thus, it is preferable that the mixing ratio of the second acid is adjusted in accordance with the applied voltage. Specifically, as an electrolytic solution having two or more kinds of acid mixed therein, which is used in the step (c), it is preferred to further satisfy the following condition ($\beta'$).

(Condition ($\beta'$))

The ratio of the volume molar concentration of a second acid to the volume molar concentration of a first acid (x'=second acid/first acid×100) satisfies the following formula (2')

$$0.85V'-60<x'<140 \qquad (2')$$

In the formula, V' represents the applied voltage during anodic oxidation in the step (c).

The electrolytic solution in the step (c) is preferably the same as the electrolytic solution used in the step (a). Meanwhile, it is not necessary to use an electrolytic solution having two or more kinds of acid mixed therein in the step (c). As described above, when an aluminum substrate in which a depression serving as a point for generating micropores has been already formed is further subjected to anodic oxidation, regularly-arranged micropores can be easily formed even under different conditions for anodic oxidation. As such, an electrolytic solution consisting of an aqueous solution of a single type of acid can be used as the electrolytic solution of the step (c). Further, when an electrolytic solution having two or more kinds of acid mixed therein is used, the ratio of the first acid is not particularly limited. Further, the acid type may be varied, if necessary.

The concentration of the electrolytic solution is as follows: when oxalic acid is used as a first acid and phosphoric acid is used as a second acid, for example, the oxalic acid concentration is preferably 0.1 to 0.8 M and the phosphoric acid concentration is preferably a concentration in which the molar ratio is 10% to 150% compared to oxalic acid. When the acid concentration is within this range, the pore depth can be easily adjusted to nano order.

The applied voltage employed in the step (c) is preferably 60 V to 120 V, and more preferably higher than 70 V but lower than 120 V, considering that an electrolytic solution having two or more kinds of acid mixed therein is obstinately used. From the viewpoint of obtaining an oxidized coating film with high quality, that is, little deviation in diameter of a depression and little heterogeneity in film thickness, it is more preferably 75 V to 110 V.

The voltage for anodic oxidation of the step (c) is preferably the same as the applied voltage of the step (a).

The time for anodic oxidation varies depending on the composition of an electrolytic solution, amount of applied voltage, and desired pore depth, and thus not particularly limited. However, for fine control of pore depth, it is preferably 3 seconds or longer.

The initial temperature of an electrolytic solution is, although not particularly limited, preferably 30° C. or lower and more preferably 20° C. or lower from the viewpoint of not easily having a change in concentration of an electrolytic solution as caused by evaporation of water due to a long time usage. Further, from the viewpoint of not requiring special equipment for maintaining an electrolytic solution at low temperature, it is preferably 6° C. or higher, more preferably 8° C. or higher, and even more preferably 10° C. or higher.
<Step (d)>

The step (d) is a step for enlarging the pore diameter in which a portion of the oxidized coating film is removed after the step (c) to enlarge the pore diameter of the micropores.

When the step (d) is performed after the step (c), part of the oxidized coating film 14 formed in the step (c) is removed so that the pore diameter of the micropore 12 is enlarged, as shown in FIG. 1, for example.

As a specific method for pore enlargement, there is a method which includes immersing in a solution for dissolving alumina and enlarging the micropores formed in an oxidized coating film by etching. Examples of the solution include an aqueous phosphoric acid solution of 5.0% by mass or so. The pore diameter increases as the time for immersion is extended.
<Step (e)>

The step (e) is a step to control the depth and shape of the micropores by alternately repeating the step (c) and the step (d).

By alternately repeating the step (c) and the step (d), shape of the micropore 12 can be prepared to have a tapered shape in which the diameter gradually decreases in the depth direction from the opening as shown in FIG. 1. As a result, the mold 18 having the oxidized coating film 14, which consists of a plurality of periodic micropore 12, on a surface can be obtained.

By suitably setting the conditions for the step (c) and the step (d), for example, concentration of an electrolytic solution or oxidation time for the anodic oxidation, time for the pore enlarging treatment, and temperature or concentration of a solution used for the pore enlarging treatment, an oxidized coating film having micropores with various shapes can be formed. Those conditions can be suitably set in accordance with the use of a molded article that is manufactured by using the mold.

From the viewpoint that a smoother tapered shape can be prepared with higher number of the step (c), the number of the step (c) is preferably 3 or more times including the step (c) which is performed before the step (e). Similarly, from the viewpoint that a smoother tapered shape can be prepared with higher number of the step (d), the number of the step (d) is preferably 3 or more times including the step (d) which is performed before the step (e). When the number is two or less for each, there is a tendency that the pore diameter discontinuously decreases. Further, when an anti-reflection product (for example, an anti-reflection film) is produced by using such mold, there is a possibility of having a lower effect of reducing the reflectivity.

The step (e) can be terminated with the step (c), or it can be terminated with the step (d).

As the time for performing the anodic oxidation increases in the step (c) and the step (e), deeper micropores can be obtained. When use is made as a mold for transferring a fine uneven structure, it is sufficient that thickness of the oxidized coating film which is finally obtained via the step (e) is approximately 0.01 to 0.8 µm. It is not necessary that the conditions for the anodic oxidation (for example, type, concentration, temperature or the like of an electrolytic solution) in the step (c) are the same as those of the step (a), except the voltage. They may be suitably changed to those enabling easy adjustment of the thickness of the oxidized coating film. Further, for repeating the step (c) and the step (d), it is not necessary to perform them at the same conditions as those of a previous step. Instead, various conditions may be suitably modified.
<Mold>

According to the method for manufacturing a mold of the present invention, micropores having a tapered shape, in which diameter gradually decreases in depth direction from the opening, are relatively regularly arranged and formed on a surface of an aluminum substrate, and as a result, a mold having an oxidized coating film having a fine uneven structure (anode oxidized porous alumina) on a surface can be manufactured.

The average interval between adjacent micropores is preferably equal to or less than the wavelength of visible light, and more preferably 150 to 600 nm. When the average interval between micropores is 150 nm or more, the scratch resistance can be improved without compromising the anti-reflection performance of a molded article obtained by transferring a mold surface (for example, an anti-reflection product), and also whitening of a molded article which is caused by integration among protrusions can be suppressed. When the average interval between micropores is 600 nm or less, scattering of visible light hardly occurs on a surface (transfer surface) of a molded article obtained by transferring a mold surface and a sufficient anti-reflection activity is exhibited, and therefore it is suitable for manufacturing an anti-reflection product such as an anti-reflection film.

Further, when the mold is used for manufacturing an anti-reflection product (for example, anti-reflection film), it is preferable that the average interval between micropores is 600 nm or less and also the pore depth is 100 nm or more, and more preferably 150 nm or more. When a mold with pore depth of less than 100 nm is used, the anti-reflection performance of an anti-reflection product may not be sufficient.

Further, the aspect ratio (=depth/average interval) of the micropores of the mold is preferably 0.25 or more, more preferably 0.5 or more, and most preferably 0.75 or more. When the aspect ratio is 0.25 or more, a surface with low reflectivity can be formed and the incident angle dependency is also sufficiently lowered.

The surface formed with a fine uneven structure of a mold may be provided with a releasing treatment to have easy release. Examples of the method for releasing treatment include a method of coating a phosphoric acid ester-based polymer, a silicone-based polymer, or a fluoropolymer, a method of vapor-depositing a fluorine compound, and a method of coating a fluorine-based surface treating agent or a fluorosilicone-based surface treating agent.

<Working Effect>

According to the method for manufacturing a mold of the present invention as described above, an aluminum substrate is subjected to anodic oxidation by using an electrolytic solution having two or more kinds of acid mixed therein such that D2 is less than half of D1 in which, with regard to the electrolytic solution having two or more kinds of acid in the step (a), D1 is the current density when the aluminum substrate is subjected to anodic oxidation under the same conditions as in the step (a) in an electrolytic solution of only the first acid having the highest acid dissociation constant Ka of the two or more kinds of acid, and D2 is the current density when the aluminum substrate is subjected to anodic oxidation under the same conditions as in the step (a) in the same electrolytic solution as that of the step (a). As such, even when the applied voltage range is as high as 60 V to 120 V, the current density can be easily controlled, the initially formed oxidized coating film can be prepared as a thin film, and also by removing the thickness of the oxidized coating film or a portion of the oxidized coating film, the heterogeneity of diameter of the depression which is formed on the aluminum substrate can be suppressed.

Thus, according to the method for manufacturing a mold of the present invention, the thickness or oxidation time of an initially formed oxidized coating film can be easily controlled without using special equipment even when the applied voltage is high, and also by removing the thickness of the initially formed oxidized coating film or at least a portion of the oxidized coating film, relatively homogeneous diameter of depression, which is formed on an aluminum substrate, can be obtained.

According to the method for manufacturing a mold of the present invention, by increasing the applied voltage, it is also possible to adjust the thickness of the initially formed oxidized coating film to a range of 0.5 to 10 µm without using special equipment even when a mold with large interval between micropores is to be produced. As such, remnants of a grain boundary or mechanical polishing that occur after removing the initially formed oxidized coating film and macro size irregularities derived from the heterogeneous thickness of the oxidized coating film are suppressed. Accordingly, a mold with fewer macro size irregularities can be manufactured.

[Method for Manufacturing Molded Article]

The method for manufacturing a molded article according to the present invention is a method in which a fine uneven structure consisting of a plurality of micropores formed on a surface of a mold, which has been obtained by the method for manufacturing a mold according to the present invention, is transferred on a surface of a main body of a molded article.

In the molded article manufactured by transferring a fine uneven structure (micropores) of a mold, the reversed structure (protrusions) of the fine uneven structure of the mold is transferred on a surface thereof as a relationship of a key and a keyhole.

As for the method of transferring a fine uneven structure of a mold on a surface of a main body of a molded article, a method including filling an uncured active energy ray curable resin composition between a mold and a transparent substrate (main body of a molded article), irradiating with active energy ray to cure the active energy ray curable resin composition while the active energy ray curable resin composition is in contact with a fine uneven structure of a mold, and releasing the mold is preferable. Accordingly, a molded article in which a fine uneven structure consisting of a cured product of an active energy ray curable resin composition is formed on a surface of a transparent substrate can be produced. The fine uneven structure of the obtained molded article has a reversed structure of the fine uneven structure of the mold.

<Main Body of Molded Article>

As for the transparent substrate, those not significantly inhibiting irradiation of active energy ray are preferred since the irradiation of active energy ray is performed through a transparent substrate. Examples of the material of a transparent substrate include a polyester resin (polyethylene terephthalate, polybutylene terephthalate, or the like), a polymethacrylate resin, a polycarbonate resin, a vinyl chloride resin, an ABS resin, a styrene resin, and glass.

<Active Energy Ray Curable Resin Composition>

The method of using an active energy ray curable resin composition is preferred for mass production because heating or cooling after curing is not required compared to a method of using a thermocurable resin composition so that a fine uneven structure can be transferred in a short time.

Examples of a method for filling an active energy ray curable resin composition include a method of adding an active energy ray curable resin composition between a mold and a transparent substrate followed by filling with rolling, a method of laminating a transparent substrate on a mold coated with an active energy ray curable resin composition, and a method of coating in advance an active energy ray curable resin composition on a transparent substrate followed by laminating on a mold.

The active energy ray curable resin composition contains a polymerization reactive compound and an active energy ray polymerization initiator. In addition to them, it may contain a non-reactive polymer or an active energy ray sol-gel reactive component depending on use. It may also contain various additives such as a thickening agent, a leveling agent, a UV absorbing agent, a photostabilizing agent, a heat stabilizing agent, a solvent, or an inorganic filler.

Examples of the polymerization reactive compound include a monomer, an oligomer, and a reactive polymer which has a radical polymerizable bond and/or a cation polymerizable bond in the molecule.

Examples of the monomer having a radical polymerizable bond include a monofunctional monomer and a polyfunctional monomer.

Examples of the monofunctional monomer having a radical polymerizable bond include a (meth)acrylate derivative (methyl (meth)acrylate, ethyl (meth)acrylate, propyl (meth)acrylate, n-butyl (meth)acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate, 2-ethoxyethyl (meth)acrylate or the like), (meth)acrylic acid, (meth)acrylonitrile, a styrene derivative (styrene, α-methylstyrene or the like), and a (meth)acrylamide derivative ((meth)acrylamide, N-dimethyl (meth)acrylamide, N-diethyl (meth)acrylamide, dimethylaminopropyl (meth)acrylamide or the like). It may be used either singly or in combination of two or more kinds.

Examples of the polyfunctional monomer having a radical polymerizable bond include a bifunctional monomer (ethylene glycol di(meth)acrylate, tripropylene glycol di(meth)acrylate, isocyanuric acid ethylene oxide modified di(meth)acrylate, triethylene glycol di(meth)acrylate, diethylene glycol di(meth)acrylate, neopentyl glycol di(meth)acrylate, 1,6-hexane diol di(meth)acrylate, 1,5-pentane diol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, di(meth)acrylate of bisphenol A ethylene oxide adduct, di(meth)acrylate of bisphenol A propylene oxide adduct, hydroxypvalic acid neopentyl glycol di(meth)acrylate, divinyl benzene, methylene bisacrylamide, or the like), a trifunctional monomer (pentaerythritol tri(meth)acrylate, trimethylol propane tri(meth)acrylate, trimethylol propane ethylene oxide modified tri(meth)acrylate, trimethylol propane propylene oxide modified triacrylate, trimethylol propane ethylene oxide modified triacrylate, isocyanuric acid ethylene oxide modified tri(meth)acrylate, or the like), a monomer with functionality of 4 or higher (condensed reaction mixture of succinic acid/trimethylol ethane/acrylic acid, dipentaerythritol hexa(meth)acrylate, dipentaerythritol penta(meth)acrylate, ditrimethylol propanetetraacrylate, tetramethylol methanetetra(meth)acrylate, or the like), urethane acrylate with functionality of 2 or higher, and polyester acrylate with functionality of 2 or higher. It may be used either singly or in combination of two or more kinds.

Examples of the monomer having a cation polymerizable bond include a monomer having an epoxy group, an oxetanyl group, an oxazolyl group, and a vinyloxy group, and a monomer having an epoxy group is particularly preferable.

Examples of the oligomer or reactive polymer having a radical polymerizable bond and/or cation polymerizable bond in the molecule include unsaturated polyesters such as a condensate of unsaturated dicarboxylic acid and polyhydric alcohol; and polyester(meth)acrylate, polyether(meth)acrylate, polyol (meth)acrylate, epoxy(meth)acrylate, urethane(meth)acrylate, a cationic polymerization type epoxy compound, and a homo- or copolymerization polymer of the monomer which has a radical polymerizable bond in the side chain.

As for the active energy ray polymerization initiator, a known polymerization initiator can be used. It is preferably selected according to type of the active energy ray which is used for curing an active energy ray curable resin composition.

When a photo-curing reaction is used, examples of the photopolymerization initiator include a carbonyl compound (benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α,α-dimethoxy-α-phenylacetophenone, methylphenylglyoxylate, ethylpenylglyoxylate, 4,4'-bis(dimethylamino)benzophenone, 2-hydroxy-2-methyl-1-phenylpropan-1-one, or the like), a sulfur compound (tetramethylthiuram monosulfide, tetramethylthiuram disulfide, or the like), 2,4,6-trimethylbenzoyldiphenylphosphine oxide, and benzoyl diethoxyphosphine oxide. It may be used either singly or in combination of two or more kinds.

When an electron beam curing reaction is used, examples of the polymerization initiator include benzophenone, 4,4-bis(diethylamino)benzophenone, 2,4,6-trimethylbenzophenone, methylorthobenzoylbenzoate, 4-phenylbenzophenone, t-butylanthraquinone, 2-ethyl anthraquinone, thioxanthones (2,4-diethyl thioxanthone, isopropylthioxanthone, and 2,4-dichlorothioxanthone), acetophenones (diethoxyacetophenone, 2-hydroxy-2-methyl-1-phenylpropan-1-one, benzyl dimethyl ketal, 1-hydroxycyclohexyl-phenyl ketone, 2-methyl-2-morpholino(4-thio methylphenyl) propan-1-one, and 2-benzyl-2-dimethylamino-1-(4-morpholinophenyl)-butanone), benzoin ethers (benzoin methyl ether, benzoin ethyl ether, benzoin isopropyl ether, and benzoin isobutyl ether), acyl phosphine oxides (2,4,6-trimethylbenzoyldiphenylphosphineoxide, bis(2,6-dimethoxybenzoyl)-2,4,4-trimethylpentylphosphineoxide, and bis(2,4,6-trimethylbenzoyl)-phenyl phosphine oxide), methylbenzoylformate, 1,7-bisacridinylheptan, and 9-phenyl acridine. It may be used either singly or in combination of two or more kinds.

The amount of the active energy ray polymerization initiator in an active energy ray curable resin composition is preferably 0.1 to 10 parts by mass based on 100 parts by mass of the polymerizable compound. When the amount of the active energy ray polymerization initiator is less than 0.1 parts by mass, it is difficult to carry out polymerization. When the amount of the active energy ray polymerization initiator is above 10 parts by mass, a curable film may be colored or mechanical strength may be lowered.

Examples of the non-reactive polymer include an acrylic resin, a styrene-based resin, polyurethane, a cellulosic resin, a polyvinyl butyral resin, a polyester resin, and a thermoplastic elastomer.

Examples of the active energy ray sol-gel reactive composition include an alkoxysilane compound and an alkyl silicate compound.

Examples of the alkoxysilane compound include those represented by $R_xSi(OR')_y$. R and R' represent an alkyl group with 1 to 10 carbon atoms, and x and y are an integer which satisfies the relationship of $x+y=4$. Specific examples thereof include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyl dimethoxysilane, dimethyl diethoxysilane, trimethylethoxysilane, trimethylmethoxysilane, trimethylpropoxysilane, and trimethylbutoxysilane.

Examples of the alkyl silicate compound include those represented by $R^1O[Si(OR^3)(OR^4)O]_zR^2$. Each of $R^1$ to $R^4$ represents an alkyl group with 1 to 5 carbon atoms, and z represents an integer of from 3 to 20. Specific examples thereof include methyl silicate, ethyl silicate, isopropyl silicate, n-propyl silicate, n-butyl silicate, n-pentyl silicate, and acetyl silicate.

<Manufacturing Apparatus>

Figure 2:
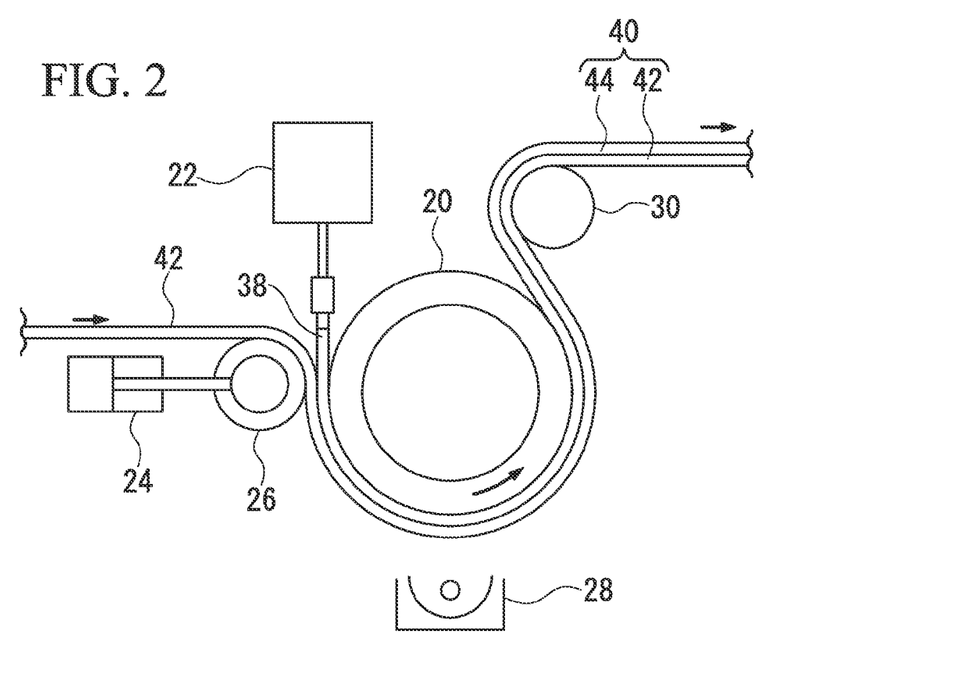
FIG. 2 is a configuration diagram illustrating an exemplary apparatus for manufacturing a molded article having a fine uneven structure on a surface.

A molded article having a fine uneven structure on the surface thereof is manufactured, for example, by using the manufacturing apparatus illustrated in FIG. 2, as follows.

The active energy ray curable resin composition 38 is supplied, from the tank 22, between the roll-shaped mold 20 having a fine uneven structure (not illustrated) on a surface thereof and the band-shaped film 42 (transparent substrate) moving along the surface of the roll-shaped mold 20.

The film 42 and the active energy ray curable resin composition 38 are nipped between the roll-shaped mold 20 and the nip roll 26 with a nip pressure adjusted by the pneumatic cylinder 24 and the active energy ray curable resin composition 38 is filled in the concave portions of the fine uneven structure of the roll-shaped mold 20 while being uniformly and broadly dispersed between the film 42 and the roll-shaped mold 20.

The cured resin layer 44 in which the fine uneven structure is transferred on the surface of the roll-shaped mold 20 is formed by irradiating an active energy ray to the active energy ray curable resin composition 38 for curing the active energy ray curable resin composition 38 through the film 42 from the active energy ray irradiation device 28 disposed below the roll-shaped mold 20.

Figure 3:
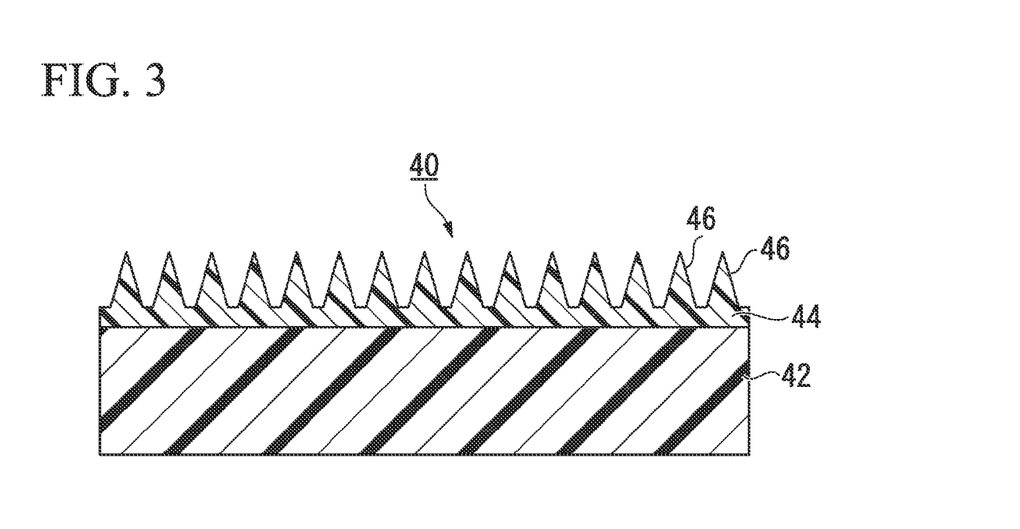
FIG. 3 is a cross-sectional view illustrating an exemplary molded article having a fine uneven structure on a surface.

The molded article 40 illustrated in FIG. 3 is obtained by separating the film 42, in which the cured resin layer 44 is formed on the surface thereof, from the roll-shaped mold 20 by the separating roll 30.

As the active energy ray irradiation device 28, a high pressure mercury lamp, a metal halide lamp or the like can be mentioned.

The irradiation amount of active energy ray is sufficiently an amount which allows curing of an active energy ray curable resin composition, and it is generally 100 to 10000 mJ/cm² or so.

<Molded Article>

The molded article 40 manufactured as described above has the cured resin layer 44 which is formed on a surface of the film 42 (transparent substrate) as illustrated in FIG. 3.

The cured resin layer 44 is a film made of a cured product of an active energy ray curable resin composition and it has a fine uneven structure on the surface thereof.

The fine uneven structure on the surface of the molded article 40 when the mold of the present invention is used is formed by transferring the fine uneven structure onto a surface of the oxidized coating film, and it has plural protrusions 46 formed of a cured product of an active energy ray curable resin composition.

It is preferable that the fine uneven structure have a so-called moth-eye structure in which plural protrusions (convex part) of a substantially conical shape, a pyramidal shape, or the like are aligned. The moth-eye structure which has an interval between protrusions equal to or less than the wavelength of visible light is known to be an effective anti-reflection means since the refractive index continuously increases from the refractive index of air to the refractive index of the material.

<Use>

By having a fine uneven structure on a surface, the molded article obtained by the manufacturing method of the present invention exhibits various performances such as anti-reflection performance or water repellency.

When the molded article having a fine uneven structure on the surface thereof has a sheet shape or a film shape, it can be used as an anti-reflection film after adhesion or insertion molding on a surface of a subject such as an image display device (display of a television or cellular phone), a display panel, or a meter panel. Further, by taking advantage of water repellency, it can be also used as a member of a subject which may be exposed to rain, water, water vapor, or the like such as a window or a mirror of a bathroom, a solar cell member, a mirror of an automobile, a signboard, or lens for eyeglasses.

If the molded article having a fine uneven structure on the surface thereof has a three-dimensional shape, it is possible that an anti-reflection product is manufactured in advance by using a transparent substrate which has a shape corresponding to the application and it is used as a member constituting a surface of the subject.

Further, when the subject is an image display device, the application is not limited to the surface, and a molded article having a fine uneven structure on the surface thereof may be adhered on the surface of the front panel or the front panel itself may be made of a molded article having a fine uneven structure on the surface thereof. For example, the molded article having a fine uneven structure on the surface thereof can be also used for a surface of a rod lens array which is attached onto a sensor array for reading an image, a cover glass of an image sensor such as a facsimile, a copying machine, and a scanner, or a contact glass of a copying machine on which papers are applied. Further, by using the molded article having a fine uneven structure on the surface thereof for a light receiving part of an optical communication device including visible light communication, signal receiving sensitivity can be also improved.

In addition to the applications described above, the molded article having a fine uneven structure on the surface thereof may be used for optical applications such as an optical waveguide, a relief hologram, optical lens, a polarization separation element, or an application as cell culture sheets.

<Working Effects>

According to the method of the present invention for manufacturing a molded article having a fine uneven structure on the surface thereof as described above, a molded article having a reversed structure of the fine uneven structure of the mold on the surface thereof can be conveniently manufactured with a single step by using a mold which has been obtained by the method for manufacturing a mold of the present invention.

Further, according to the method for manufacturing a mold of the present invention described above, even when a mold with a large interval between microspores is produced as a high applied voltage is employed, it is unlikely that remnants of a grain boundary or mechanical polishing and macro size irregularities derived from the heterogeneous thickness of the oxidized coating film are transferred onto a transfer surface of a mold. Accordingly, by using a mold which is obtained by the method for manufacturing a mold of the present invention, a molded article with excellent appearance quality with no significant macro size irregularities derived from the mold can be produced even with a large interval between protrusions (for example, 150 nm or more).

EXAMPLES

Hereinbelow, the present invention is specifically explained in view of examples. However, the present invention is not limited to them.

Various measurements and evaluations were made according to the method described below.

(Thickness of Oxidized Coating Film Formed in the Step (a))

A part of the oxidized surface of an aluminum substrate was cut after performing the step (a), platinum was vapor-deposited on the longitudinal cross-section thereof for one minute, and the cross-section was observed using a field emission scanning electron microscope (manufactured by JEOL Ltd., JSM-7400F) under conditions of an accelerating voltage of 3.00 kV. The cross-section sample was observed with magnification ratio of ×2000, and the thickness of the oxidized coating film was measured within the observation range. The measurement was made at two points and the evaluation was made according to the following criteria.

⊙: There is no difference in the thickness of an oxidized coating film between two points that have been subjected to the measurement, and the thickness is homogeneous in general.

○: The difference in thickness of an oxidized coating film between two points that have been subjected to the measurement was less than 0.5 µm.

Δ: The difference in thickness of an oxidized coating film between two points that have been subjected to the measurement was equal to or greater than 0.5 µm but less than 0.8 µm.

x: The difference in thickness of an oxidized coating film between two points that have been subjected to the measurement was equal to or greater than 0.8 µm, and the thickness is heterogeneous.

(Deviation in Diameter of Depression Formed on Aluminum Substrate)

The oxidized coating film formed in the step (a) was removed, and a part of an aluminum substrate was cut, platinum was vapor-deposited for one minute, and the observation was made using a field emission scanning electron microscope (manufactured by JEOL Ltd., JSM-7400F) under conditions of an accelerating voltage of 3.00 kV. The surface sample was observed with magnification ratio of ×10000. The diameter of a depression, which is a trace of coating film cell, is observed within the observation range (12 µm×9 µm) and, by selecting arbitrarily three points for relatively small depression and relatively large depression within the viewing range, the ratio of average diameter value of the large depression compared to average diameter value of the small depression was obtained. The measurement was performed within an observation range having two points for each sample and the evaluation was made according to the following criteria.

⊙: Diameter of the depression is homogeneous in general.

○: There are depressions having a diameter at least 1.5 times that of a depression with small diameter.

Δ: There are depressions having a diameter at least 1.8 times that of a depression with small diameter.

x: There are depressions having a diameter at least 2.0 times that of a depression with small diameter.

(Average Interval and Depth of Micropores of Mold)

A part of the mold having an oxidized coating film formed on a surface thereof was cut, platinum was vapor-deposited on the surface for one minute and it was observed using a field emission scanning electron microscope (manufactured by JEOL Ltd., JSM-7400F) under conditions of an accelerating voltage of 3.00 kV. The observation was made with magnification ratio of ×10000. The average interval between micropores (pitch) was obtained by averaging center-to-center distance of six micropores that are arranged on a straight line.

Furthermore, a part of the mold was cut at two separate points, platinum was vapor-deposited on the longitudinal cross-section thereof for one minute, and the cross-section was observed using a field emission scanning electron microscope under conditions of an accelerating voltage of 3.00 kV in the same manner as above. Each cross-section sample was observed with magnification ratio of ×50000, and the depth of 10 micropores within the observation range was measured and the average value was obtained. The measurement was made at two points and, by averaging again the average value of each observation point, the average depth of micropore was obtained.

(Average Interval and Height of Protrusions in Molded Article)

Platinum was vapor-deposited on the surface and the longitudinal cross-section of a molded article (film) for ten minutes and the surface and cross-section of the molded article was observed using a field emission scanning electron microscope (manufactured by JEOL Ltd., JSM-7400F) under conditions of an accelerating voltage of 3.00 kV. The observation of the surface of the molded article was made with magnification ratio of ×10000. The average interval between protrusions (pitch) was obtained by averaging center-to-center distance of six protrusions (convex part) that are arranged on a straight line. Furthermore, the cross-section of the molded article was observed with magnification ratio of ×50000. By averaging the height of 10 protrusions, the average height of the protrusion was obtained.

(Appearance Evaluation of Molded Article)

The appearance of the molded article (film) was visually observed and evaluation was made according to the following criteria.

○: Macro size irregularities that are generated as a result of transferring steps in a grain boundary of the mold were not visually seen.

x: Macro size irregularities that are generated as a result of transferring steps in a grain boundary of the mold were visually seen.

Example 1

Measurement of Current Density:

A 0.3 mm thick aluminum plate of 99.99% by mass in purity was cut to a size of 30 mm×90 mm and then subjected to electrolytic polishing in a solution of perchloric acid/ethanol mixture (volume ratio=1/4), and used as an aluminum substrate.

To 0.3 M aqueous solution of oxalic acid as a first acid, phosphoric acid was added as a second acid. 4.6 of mixed aqueous solution in which phosphoric acid concentration has been adjusted to 0.05 M was used as an electrolytic solution, and the initial temperature of the electrolytic solution was adjusted to 15° C. while stirring at 350 rpm by using a half-moon shaped stirring wing with diameter of 8 cm and height of 2 cm. The aluminum substrate was immersed in the electrolytic solution and subjected to anodic oxidation for 30 minutes at an applied voltage of 80 V. The maximum value of the current density during the anodic oxidation is shown in Table 1.

Examples 2 to 17 and Comparative Examples 1 to 7

The anodic oxidation was performed in the same manner as that of Example 1 except that the composition of an electrolytic solution, an applied voltage, and initial temperature of an electrolytic solution are changed as shown in Table 1. The maximum value of the current density during the anodic oxidation is shown in Table 1. Meanwhile, since thermal runaway has occurred in Comparative Examples 5 to 7, the anodic oxidation was terminated at a stage where the current density is over 120 mA/cm².

Step (b):
The aluminum plate formed with the oxidized coating film was immersed in a mixed aqueous solution of 6% by mass of phosphoric acid and 1.8% by mass of chromic acid for 3 hours at 70° C. to dissolve and remove the oxidized coating film. Accordingly, the depressions serving as a point for generating micropores by anodic oxidation were

TABLE 1

| | Composition of electrolytic solution | | | Volume molar concentration ratio x [%] | Voltage [V] | Initial temperature of electrolytic solution [° C.] | Maximum value of current density [mA/cm²] |
| --- | --- | --- | --- | --- | --- | --- | --- |
| | Oxalic acid [mol/L] | Phosphoric acid [mol/L] | Malonic acid [mol/L] | | | | |
| Example 1 | 0.3 | 0.05 | — | 17 | 80 | 15 | 22.2 |
| Example 2 | 0.3 | 0.1 | — | 33 | 80 | 15 | 14.7 |
| Example 3 | 0.3 | 0.2 | — | 67 | 80 | 15 | 5.6 |
| Example 4 | 0.25 | 0.3 | — | 120 | 80 | 15 | 2.5 |
| Example 5 | 0.2 | 0.3 | — | 150 | 80 | 15 | 1.5 |
| Example 6 | 0.3 | 0.3 | 0.05 | 117 | 80 | 15 | 2.6 |
| Example 7 | 0.3 | 0.3 | 0.1 | 113 | 80 | 15 | 2.8 |
| Comparative Example 1 | 0.3 | — | — | 0 | 80 | 15 | 66.4 |
| Example 8 | 0.3 | 0.1 | — | 33 | 60 | 15 | 3.6 |
| Comparative Example 2 | 0.3 | — | — | 0 | 60 | 15 | 15 |
| Example 9 | 0.3 | 0.1 | — | 33 | 70 | 15 | 6.9 |
| Comparative Example 3 | 0.3 | — | — | 0 | 70 | 15 | 33.1 |
| Example 10 | 0.3 | 0.1 | — | 33 | 90 | 15 | 23.3 |
| Example 11 | 0.3 | 0.1 | — | 33 | 100 | 15 | 32.3 |
| Example 12 | 0.1 | 0.025 | — | 25 | 110 | 15 | 54.4 |
| Example 13 | 0.1 | 0.05 | — | 50 | 110 | 15 | 16.9 |
| Example 14 | 0.25 | 0.3 | — | 120 | 110 | 15 | 9.2 |
| Example 15 | 0.1 | 0.05 | — | 50 | 120 | 15 | 40.6 |
| Example 16 | 0.25 | 0.3 | — | 120 | 120 | 15 | 18.3 |
| Example 17 | 0.3 | 0.1 | — | 33 | 80 | 10 | 7.8 |
| Comparative Example 4 | 0.3 | — | — | 0 | 80 | 10 | 56.9 |
| Comparative Example 5 | 0.3 | — | — | 0 | 90 | 15 | >120 |
| Comparative Example 6 | 0.25 | — | — | 0 | 110 | 15 | >120 |
| Comparative Example 7 | 0.1 | — | — | 0 | 110 | 15 | >120 |

As it is clearly shown in Table 1, compared to a case in which anodic oxidation is performed by using only oxalic acid as an electrolytic solution, the current density was significantly lowered when anodic oxidation is performed by using a mixed aqueous solution of oxalic acid and phosphoric acid as an electrolytic solution.

Example 18

Step (a):
The same aluminum substrate as that of Example 1 was prepared.
To 0.3 M aqueous solution of oxalic acid, phosphoric acid was added. 4.6 of mixed aqueous solution in which phosphoric acid concentration has been adjusted to 0.05 M was used as an electrolytic solution, and the initial temperature of the electrolytic solution was adjusted to 15° C. while stirring at 350 rpm by using a half-moon shaped stirring wing with diameter of 8 cm and height of 2 cm. The aluminum substrate was immersed in the electrolyte solution and subjected to anodic oxidation for 30 minutes at an applied voltage of 80 V. Conditions for the anodic oxidation of step (a), the thickness of the obtained oxidized coating film, the average interval between micropores, and the evaluation results of the thickness heterogeneity are shown in Table 2.

exposed. The deviation in diameter of the depression formed on the aluminum substrate is shown in Table 2.

Step (c):
The aluminum substrate with exposed point for generating micropores was immersed in a mixed aqueous solution containing 0.3 M oxalic acid and 0.1 M phosphoric acid, which has been adjusted to 15° C., and then subjected to anodic oxidation for 7 seconds at 80 V to form again an oxidized coating film on a surface of the aluminum substrate.

Step (d):
The aluminum substrate having an oxidized coating film formed thereon was immersed for 19 minutes in an aqueous solution of 5% by mass phosphoric acid which has been adjusted to 32° C., and thus the pore enlargement for enlarging the micropores of an oxidized coating film was performed.

Step (e):
The step (c) and the step (e) were again repeated four times alternately followed by the step (d) as a final step. In other words, the step (c) was performed five times in total and the step (d) was performed also five times in total.

After that, it was cleaned with de-ionized water and moisture on the surface was removed by using an air blower.

As a result, a mold having an oxidized coating film formed thereon, in which the film has substantially cone shaped micropores with the average interval of 180 nm and average depth of about 230 nm, was obtained.

The mold obtained as above was immersed for 10 minutes in an aqueous solution in which TDP-8 (manufactured by Nikko Chemicals Co., Ltd.) has been diluted to 0.1% by mass, and then subjected to a releasing treatment by drying overnight with blowing air.

Manufacturing of Molded Article:

Between the mold obtained after a releasing treatment and an acrylic film as a transparent substrate (ACRYLPLEN HBS010, manufactured by Mitsubishi Rayon Co., Ltd.), an active energy ray curable resin composition with the following composition was filled in, and ultraviolet ray with integrated light amount of 1000 mJ/cm$^2$ was irradiated by using a high pressure mercury lamp to cure the active energy ray curable resin composition. After that, the mold was peeled and a molded article (film) consisting of a transparent substrate and a cured product of a curable composition was obtained.

On the surface of the molded article which has been prepared from the above, a fine uneven structure was formed in which the average interval between protrusions (pitch) was 180 nm and the average height of the protrusion was about 220 nm.

Active Energy Ray Curable Resin Composition:

Trimethylol ethane.acrylic acid.succinic anhydride condensed ester: 45 parts by mass, 1,6-Hexane diol diacrylate: 45 parts by mass, X-22-1602 (trade name) manufactured by Shin-Etsu Chemical Co., Ltd.: 10 parts by mass, IRGACURE 184 (trade name) manufactured by BASF: 2.7 parts by mass, and IRGACURE 819 (trade name) manufactured by BASF: 0.18 parts by mass.

Examples 19 to 33 and Comparative Examples 8 to 10

The anodic oxidation was performed in the same manner as that of Example 18 except that the step (a) has the conditions described in Table 2, and the voltage, composition of an electrolytic solution, and initial temperature of an electrolytic solution of the step (c) is the same as those of the step (a) respectively. The conditions for anodic oxidation of the step (a), maximum value of the current density, thickness of the obtained oxidized coating film, average interval between micropores, thickness heterogeneity, and deviation in diameter of the depression formed on the aluminum plate are shown in Table 2.

TABLE 2

| | Composition of electrolytic solution | | | Volume molar concentration ratio x [%] | 0.85 V-60 [%] | Voltage [V] | Initial temperature of electrolytic solution [° C.] | Time for anodic oxidation [min] | Oxidized coating film | | Thickness heterogeneity of oxidized coating film | Diameter deviation of depression |
|---|---|---|---|---|---|---|---|---|---|---|---|---|
| | Oxalic acid [mol/L] | Phosphoric acid [mol/L] | Malonic acid [mol/L] | | | | | | Thickness [μm] | Average interval between micropores [nm] | | |
| Example 18 | 0.3 | 0.05 | — | 17 | 8 | 80 | 15 | 5 | 0.7 | 180 | ⊙ | ⊙ |
| Example 19 | 0.3 | 0.1 | — | 33 | 8 | 80 | 15 | 30 | 10 | 180 | ⊙ | ⊙ |
| Example 20 | 0.3 | 0.2 | — | 67 | 8 | 80 | 15 | 30 | 3.2 | 180 | ⊙ | ⊙ |
| Example 21 | 0.25 | 0.3 | — | 120 | 8 | 80 | 15 | 15 | 0.7 | 180 | ⊙ | ⊙ |
| Example 22 | 0.3 | 0.3 | 0.05 | 117 | 8 | 80 | 15 | 20 | 0.9 | 180 | ⊙ | ⊙ |
| Example 23 | 0.3 | 0.3 | 0.1 | 113 | 8 | 80 | 15 | 5 | 1.1 | 180 | ⊙ | ⊙ |
| Example 24 | 0.2 | 0.3 | — | 150 | 8 | 80 | 15 | 20 | 0.6 | 180 | ⊙ | Δ |
| Example 25 | 0.3 | 0.1 | — | 33 | 16.5 | 90 | 15 | 15 | 8.4 | 210 | ⊙ | ⊙ |
| Example 26 | 0.3 | 0.04 | — | 13 | 16.5 | 90 | 15 | 3 | 3.3-3.9 | 210 | Δ | Δ |
| Example 27 | 0.3 | 0.2 | — | 67 | 25 | 100 | 15 | 20 | 9.3 | 230 | ⊙ | ⊙ |
| Example 28 | 0.3 | 0.1 | — | 33 | 33.5 | 110 | 15 | 3 | 4.2-4.9 | 260 | Δ | Δ |
| Example 29 | 0.1 | 0.05 | — | 50 | 33.5 | 110 | 15 | 10 | 4.3 | 260 | ⊙ | ○ |
| Example 30 | 0.25 | 0.3 | — | 120 | 33.5 | 110 | 15 | 15 | 3.3 | 260 | ⊙ | ○ |
| Example 31 | 0.2 | 0.3 | — | 150 | 33.5 | 110 | 15 | 20 | 2.1 | 260 | ⊙ | Δ |
| Example 32 | 0.1 | 0.05 | — | 50 | 42 | 120 | 15 | 5 | 5.7-6.4 | 280 | Δ | Δ |
| Example 33 | 0.25 | 0.3 | — | 120 | 42 | 120 | 15 | 10 | 3.6-4.3 | 280 | Δ | ○ |
| Comparative Example 8 | 0.3 | — | — | 0 | — | 80 | 15 | 5 | 10.0-11.0 | 180 | X | ○ |
| Comparative Example 9 | 0.05 | — | — | 0 | — | 80 | 15 | 5 | 1.0-1.8 | 180 | X | ○ |
| Comparative Example 10 | — | 0.2 | — | 0 | — | 80 | 15 | 30 | 0.6 | 180 | ⊙ | X |

The maximum value of the current density was lowered when a mixed aqueous solution is used as an electrolytic solution. Thus, as it is clearly shown in Table 2, the thickness of the oxidized coating film is never higher than 10 μm even the time for anodic oxidation is as long as 30 minutes. Furthermore, although the rate for forming an oxidized coating film increases in accordance with an increase in oxalic acid concentration, the thickness of the oxidized coating film can be easily adjusted to a desired range by controlling the time for anodic oxidation as the anodic oxidation can be achieved at room temperature by addition of phosphoric acid.

In Examples 18 to 23, Example 25, Example 27, and Examples 29, 30, 32, and 33 in which the volume molar concentration ratio x and the applied voltage V satisfy the formula (2), both the heterogeneity in thickness of the oxidized film and deviation in diameter of the depression were suppressed.

As described above, by following the method described in Examples, the current density value can be suppressed even without using special equipment, and therefore a mold having a fine uneven structure on a surface thereof can be produced with convenience and economic feasibility. Further, because the obtained mold has no prominent macro size irregularities, it is possible to obtain a molded article with excellent appearance quality by transferring.

INDUSTRIAL APPLICABILITY

The mold obtained by the method for manufacturing a mold of the present invention is useful for efficient mass production of an anti-reflection product, an anti-fogging product, an anti-fouling product, and a water-repellent product. Further, the molded article obtained by the method for manufacturing a molded article which has a fine uneven structure on the surface thereof as described in the present invention is useful as an anti-reflection product, an anti-fogging product, an anti-fouling product, and a water-repellent product.

EXPLANATIONS OF LETTERS OR NUMERALS

10 ALUMINUM SUBSTRATE
12 MICROPORE
14 OXIDIZED COATING FILM
16 DEPRESSION
18 MOLD
20 ROLL-SHAPED MOLD
40 MOLDED ARTICLE
42 FILM
46 PROTRUSION

The invention claimed is:

1. A method for manufacturing a mold which has an oxidized coating film having a plurality of micropores formed on a surface of an aluminum substrate, the method comprising:
   (a) performing anodic oxidation of an aluminum substrate at a voltage of 70 V but less than 120 V in an electrolytic solution having three or more kinds of acid mixed therein to form an oxidized coating film having a plurality of micropores on a surface of the aluminum substrate,
   wherein, as the electrolytic solution having three or more kinds of acid mixed therein for use in (a), a solution satisfying the following condition ($\alpha$) is used, wherein in condition ($\alpha$)
   D1 is the current density when the aluminum substrate is subjected to anodic oxidation under the same conditions as in (a) in an electrolytic solution of only the acid A having the highest acid dissociation constant Ka of the three or more kinds of acid,
   D2 is the current density when the aluminum substrate is subjected to anodic oxidation under the same conditions as in (a) in the same electrolytic solution as that of (a), and
   D1 and D2 satisfy the following formula (1):

$$(D1)/2 > D2 \qquad (1),$$

and the solution used as the electrolytic solution in (a) further satisfying the following condition ($\beta$), wherein in condition ($\beta$)
   the ratio of the volume molar concentration of the acids other than the acid A to the volume molar concentration of the acid A (x=other acids/acid A×100) satisfies the following formula (2):

$$0.85V-60 < x < 140 \qquad (2),$$

wherein in the formula (2), V represents the voltage applied during anodic oxidation in (a);
   (b) removing at least a portion of the oxidized coating film which has been formed in (a);
   (c) comprising (c)(1) subjecting the aluminum substrate to anodic oxidation after (b) or (c)(2) subjecting the aluminum substrate to anodic oxidation after the following (d) so as to form an oxidized coating film having a plurality of micropores,
   (d) removing a portion of the oxidized coating film is removed after (c) and the pore diameter of the micropores is enlarged, and
   (e) alternately repeating (c)(2) and (d).

2. The method for manufacturing a mold according to claim 1, wherein the anodic oxidation of the aluminum substrate is performed at a voltage of 75 V to 110 V in (a).

3. The method for manufacturing a mold according to claim 1, wherein the initial temperature of the electrolytic solution for use in (a) is 6° C. or higher.

4. The method for manufacturing a mold according to claim 1, wherein the acid A used in (a) is oxalic acid.

5. The method for manufacturing a mold according to claim 1, wherein one of the acids other than the acid A for use in (a) is phosphoric acid.

6. The method for manufacturing a mold according to claim 1, wherein the electrolytic solution for use in (a) comprises a mixture solution including oxalic acid and phosphoric acid.

7. The method for manufacturing a mold according to claim 1, wherein
   the aluminum substrate is subjected to anodic oxidation in (c) at a voltage of 70 V but less than 120 V in an electrolytic solution having three or more kinds of acid mixed therein, and
   a solution satisfying the following condition ($\alpha'$) is used as the electrolytic solution, wherein the electrolytic solution has three or more kinds of acid mixed therein for use in (c), wherein in condition ($\alpha'$)
   D1' is the current density when the aluminum substrate is subjected to anodic oxidation under the same conditions as in (c) in an electrolytic solution of only the acid A' having the highest acid dissociation constant Ka of the three or more kinds of acid,
   D2' is the current density when the aluminum substrate is subjected to anodic oxidation under the same conditions as in (c) in the same electrolytic solution as that of (c), and
   D1' and D2' satisfy the following formula (1'):

$$(D1')/2 > D2' \qquad (1').$$

8. The method for manufacturing a mold according to claim 7,
   the solution further satisfying the following condition ($\beta'$) is used as the electrolytic solution for use in (c), wherein in condition ($\beta'$)
   the ratio of the volume molar concentration of the acids other than the acid A' to the volume molar concentration of the acid A' (x'=other acids/acid A'×100) satisfies the following formula (2'):

$$0.85V'-60 < x' < 140 \qquad (2'),$$

wherein in the formula (2), V' represents the voltage applied during anodic oxidation in (c).

9. The method for manufacturing a mold according to claim 8, wherein the anodic oxidation of the aluminum substrate is performed at a voltage of 75 V to 110 V in (c).

10. The method for manufacturing a mold according to claim 7, wherein the initial temperature of the electrolytic solution for use in (c) is 6° C. or higher.

11. The method for manufacturing a mold according to claim 1, wherein one of the acids other than the acid A for use in (a) is malonic acid or tartaric acid.

12. The method for manufacturing a mold according to claim 5, wherein the electrolytic solution having two or more kinds of acid mixed therein for use in (a) further comprises malonic acid as a third acid.

13. The method for manufacturing a mold according to claim 12, wherein in (a) the anodization is conducted at 80 V and the electrolytic solution includes malonic acid at a concentration of 0.05 mol/L to 0.1 mol/L.

14. The method for manufacturing a mold according to claim 1, wherein in (a) and in (c) the anodic oxidation of an aluminum substrate is conducted at a voltage of 80 V to 120 V.

15. The method for manufacturing a mold according to claim 1, wherein in (a) the oxidized coating film is 0.5 to 10 μm thick.

16. The method for manufacturing a mold according to claim 12, wherein in (a) the electrolytic solution includes malonic acid at a concentration of 0.05 mol/L or 0.1 mol/L.

17. A method for manufacturing a mold which has an oxidized coating film having a plurality of micropores formed on a surface of an aluminum substrate, the method comprising:

performing anodic oxidation of an aluminum substrate at a voltage in a range from 70 V up to less than 120 V in an electrolytic solution having three or more kinds of acid mixed therein to form an oxidized coating film having a plurality of micropores on a surface of the aluminum substrate, wherein, as the electrolytic solution having three or more kinds of acid mixed therein for use in (a), a solution satisfying the following condition ($\alpha$) is used, wherein in condition ($\alpha$)

D1 is the current density when the aluminum substrate is subjected to anodic oxidation under the same conditions as in (a) in an electrolytic solution of only the acid A having the highest acid dissociation constant Ka of the three or more kinds of acid, D2 is the current density when the aluminum substrate is subjected to anodic oxidation under the same conditions as in (a) in the same electrolytic solution as that of (a), and D1 and D2 satisfy the following formula (1):

$$(D1)/2 > D2 \qquad (1), \text{ and}$$

wherein the solution used as the electrolytic solution in (a) further satisfying the following condition ($\beta$), wherein in condition ($\beta$)

the ratio of the volume molar concentration of the acids other than the acid A to the volume molar concentration of the acid A (x = other acids/acid A ×100) satisfies the following formula (2):

$$0.85V - 60 < x < 140 \qquad (2),$$

wherein in the formula (2), V represents the voltage applied during anodic oxidation in (a).

18. The method according to claim 17, wherein electrolytic solution has three kinds of acid mixed therein.

* * * * *